Figure 1:
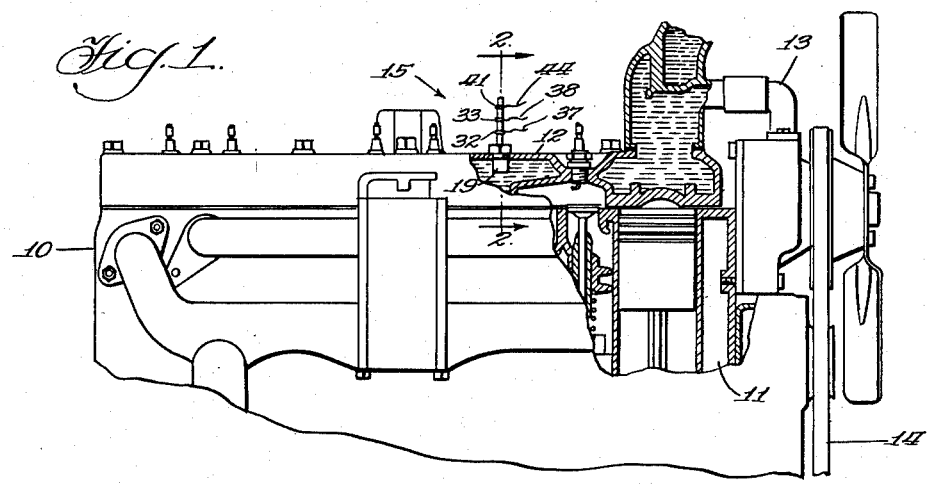

Sept. 9, 1952 W. M. SMITH 2,610,236
LOW WATER ALARM
Filed July 1, 1949

INVENTOR.
William M. Smith
BY
Harvey M. Gillespie
Atty.

Patented Sept. 9, 1952

2,610,236

UNITED STATES PATENT OFFICE 2,610,236

LOW WATER ALARM

William M. Smith, Glen Ellyn, Ill., assignor to Vapor Heating Corporation, Chicago, Ill., a corporation of Delaware Application July 1, 1949, Serial No. 102,523

3 Claims. (Cl. 177—311)

This invention relates to thermostatically actuated indicators and particularly to devices of this character for indicating both the temperature and level of a coolant contained in an internal combustion engine.

One of the principal objects of this invention is to provide an improved device for giving a visual indication of the temperature and level of a liquid coolant contained in an internal combustion engine, and which will also give an additional audible and visual signal when the temperature of the coolant reaches a predetermined maximum or when the level thereof is too low, regardless of its temperature.

Another object is to provide a thermostat for giving a visual indication of proper cooling conditions of an internal combustion engine, that is to say, when the coolant will normally function to dissipate surplus heat generated by the engine operation. In this connection the invention includes a thermostat arranged in close relation to an electrical heater, the latter of which is so positioned that the major portion of its heat will be dissipated by the coolant when the temperature and level thereof are within prescribed limits. The heat from the electrical heater functions to raise the reading of the thermostat to energize a circuit incorporating audible signal means for indicating that the temperature of the engine coolant has risen to a danger point or for indicating that the level of the coolant within the engine jacket has dropped to a danger level.

The invention is illustrated in the accompanying drawing which shows a preferred embodiment of the invention, and what is now considered the best mode of applying the same. While the invention is described in terms of an embodiment which it may assume in practice, it is not intended to be limited in terms of the embodiment shown, nor otherwise than by the claims appended.

Figure 2:
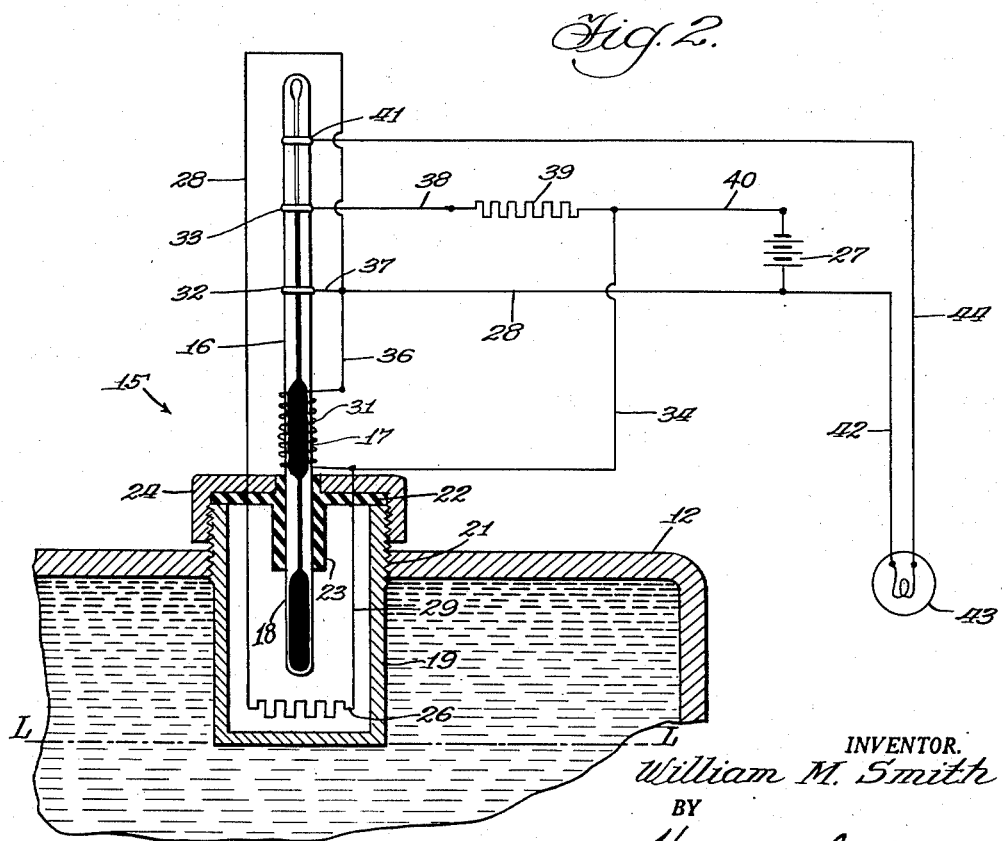

In the drawing:

Fig. 1 is a side view of an internal combustion engine, with parts thereof shown in section, and showing the indicator device according to the present invention applied thereto; and Fig. 2 is an enlarged sectional view of a portion of the cooling jacket of the internal combustion engine of Fig. 1 showing the indicator device of the present invention together with a schematic circuit diagram therefor.

Referring particularly to Fig. 1 of the drawings, there is shown an internal combustion engine 10 having a jacket 11 for coolant and a jacketed cylinder head 12 also containing coolant. The coolant is circulated in the jacket 11 and the cylinder head 12 through a heat exchanger, not shown, by means of a coolant pump 13 driven from the engine 10 by a fan belt 14.

In order to provide an indication of the level and temperature of the coolant within the jacket of the cylinder head 12 there is provided a thermostatically actuated indicator device 15, see also Fig. 2, which comprises a mercury column thermostat 16 having a pair of interconnected bulbs 17 and 18 for containing a quantity of mercury. The thermostat 16 is supported in a visible position by a cylindrical housing 19 which extends into the jacket of the cylinder head 12 or other convenient part of the engine and which is threaded therein as at 21. The stem of the thermostat 16 is held to the housing 19 by means of a suitable holding device, for example a washer-like resilient clamping member 22 having a central sleeve 23 which embraces the stem of the thermostat 16. The clamping member 22 together with the thermostat 16 is held to the housing 19 by an annular nut 24 threaded to the portion of the housing 19 protruding above the cylinder head 12.

The bulb 18 is heated by a heater 26 which is located in proximity to the bulb 18, and which is supplied with energy from a battery 27. The energizing circuit for the heater 26 extends from one side of the battery through lead 28 thence through leads 29, 34 and 40 to the other side of the battery. Under normal conditions of operation, for example, when the engine jacket is entirely filled with coolant at or below a normal operating temperature, for example 160° F., the heater 26 dissipates the major portion of its heat through the walls of the housing 19 and into the coolant contained in the cooling jacket. However, when the temperature of the coolant is so high that it is impossible to provide for good heat exchange through the walls of the housing 19, or when the level of the coolant drops to a position below or near the level L—L, and the space in the jacket above the level of the coolant becomes overheated, so that it is also impossible to provide for good heat exchange, the heater 26 transmits the major portion of its heat into the bulb 18 to cause the mercury column of the thermostat 16 to rise and give a visual indication of the overheated and/or the low level of the coolant within the jacket of the engine.

A booster heater 31 cooperates with heater 26 to raise the column of mercury within the thermostat 16 to give a visual indication that the signal system is operative and that the temperature of the coolant is below a danger temperature. The temperature may be even less than the normal temperature during normal operation of the engine 10, but in such case the heater 31 supplements the heating effect of heater 26 and thereby raises the mercury column in the thermostat. To this end the thermostat 16 is provided with contacts 32 and 33 in circuit with the battery 27 to control cycling of the auxiliary or booster heater 31. Under the condition of operation when the temperature of the coolant is less than the normal operating temperature, the booster heater 31 is in circuit with the battery 27 through lead 40, a lead 34 branching therefrom and a lead 36 connected to the lead 28, and thence to the battery 27. The operation of the heater 31 will assist the heater 26 in applying sufficient heat to the thermostat 16 to raise the level of mercury therein until the mercury makes contact with the contact 33. Under this condition a shunt circuit is provided which shunts out the auxiliary booster heater 31.

The mercury column which now contacts both the contact points 32 and 33 closes a shunt circuit which includes the battery 27, lead 28, a lead 37 to contact 32, the mercury column in the tube 16, contact 33, a lead 38 and a buffer resistor 39, and thence to the leads 34 and 40 and the battery 27. The resistance value of buffer resistor 39 relative to the heaters 31 and 26 is such that it will short out the higher resistance heater 31 but will not short out the heater 26, when the mercury column of the thermostat engages contact 33. Consequently the heater 26 is heated at all times and dissipates the major portion of its heat to the coolant and the residual portion of its heat to the bulb 18.

A visual and audible indication is given upon the lowering of the level of the coolant, or upon the heating thereof to a danger point. To this end the mercury which rises in the tube 16 will give a visual indication of an overheated condition, and additionally will close a circuit giving an additional audible or visual signal, as desired. When the level of the coolant drops to the line L—L or when the coolant becomes overheated, the failure of the heat created in the heater 26 to be dissipated through the wall of the housing 19 causes the mercury in the tube to continue to rise until it makes contact with a contact 41. Upon contact of the mercury with the contact 41 a circuit is made which includes the battery 27, lead 42, signal lamp or other indicator 43, a lead 44, contact 41, the mercury column in tube 16, contact 33, lead 38 and thence to the battery 27 through the buffer resistor 39 and the lead 40.

It will be seen that according to the present invention there has been provided a novel and useful device for indicating the condition of the coolant of an internal combustion engine. While the invention has been described in terms of an embodiment which it may assume in practice, its scope is not intended to be limited to the embodiment herein disclosed nor otherwise than by the appended claims.

I claim:

1. A temperature responsive device for giving indications relative to the temperature of a body of liquid coolant contained within a coolant jacket of an internal combustion engine, said device comprising a liquid column thermostat provided with spaced contacts one of which represents the normal functional setting of the thermostat and the other the maximum allowable temperature of the coolant and the space between said contacts serving with the liquid column to indicate temperature conditions between the normal operating temperature and the maximum allowable temperature of the coolant, a housing for a temperature sensitive portion of the thermostat positioned to extend into said coolant body, an electrical heater positioned in said housing, whereby the thermostat responds to the combined temperatures of the electrical heater and the coolant body; the said heater being of a value to apply sufficient heat to the thermostat to maintain it closed when the coolant is at a predetermined operating temperature and adapted to dissipate a progressively increasing portion of its heat to the thermostat and a progressively decreasing portion of its heat to the coolant body as the temperature of the coolant body increases, an energizing circuit for said heater, an electrical booster heater for applying additional heat to the thermostat, an energizing circuit for the booster heater connected in parallel with the energizing circuit for the first mentioned heater, an electrical conductor leading from a conductor of the last mentioned circuit to the said thermostat contact and effective to short out the booster heater when the thermostat is closed at said contact, whereby the thermostat cycles by the recurrent application of heat from said booster heater until the temperature of the coolant and the heat supplied by the first mentioned heater corresponds to the normal functional setting of the thermostat.

2. A temperature responsive device for giving indications relative to the temperature and level of a body of liquid coolant contained within a coolant jacket of an internal combustion engine, said device comprising a liquid column thermostat provided with spaced contacts one of which represents the normal functional setting of the thermostat and the other the maximum allowable heat transfer to the thermostat and the space between the contacts serving with said liquid column to give visual indication of the level of the coolant intermediate the normal and low levels thereof, a housing for a temperature sensitive portion of the thermostat positioned to extend into said coolant body and defining the low level thereof, an electrical heater positioned in said housing, whereby the thermostat responds to the temperatures of the electrical heater and the coolant body; the said heater being of a value to apply sufficient heat to the thermostat to maintain it closed when the coolant is at a predetermined operating temperature and adapted to dissipate a progressively increasing portion of its heat to the thermostat and a progressively decreasing portion of its heat to the coolant body as the coolant within said jacket declines from its normal level toward said low level, an energizing circuit for said heater, an electrical booster heater for applying additional heat to the thermostat, an energizing circuit for the booster heater connected in parallel with the energizing circuit for the first mentioned heater, an electrical conductor leading from a conductor of the last mentioned circuit to the said thermostat contact representing the normal temperature setting and effective to short out the booster heater when the thermostat is closed at said contact, whereby the thermostat cycles by the recurrent application of heat from said booster heater until the temperature of the coolant plus the heat transferred from the first mentioned heater to the thermostat corresponds to the normal functional setting of the thermostat.

3. A temperature responsive device for giving indications relative to the temperature and the level of liquid coolant contained within a coolant jacket of an internal combustion engine, said device comprising a thermostat provided with spaced lower and upper contacts representing, respectively, the normal functional setting of the thermostat and the maximum allowable temperature of the coolant, a housing for a temperature sensitive portion of the thermostat positioned to extend into said coolant body and defining the low level thereof, an electrical heater having a value, when the coolant has a predetermined temperature corresponding to the temperature value of the spacing between said thermostat contacts and positioned in said housing, whereby the thermostat responds to the combined temperatures of the electrical heater and the coolant body; the said heater being of a value to apply sufficient heat to the thermostat to maintain it closed when the coolant is at a predetermined operating temperature and adapted to dissipate a progressively increasing portion of its heat to the thermostat and a progressively decreasing portion of its heat to the coolant body as the temperature of the coolant body increases, an energizing circuit for said heater, an electrical booster heater for applying additional heat to the thermostat, an energizing circuit for the booster heater connected in parallel with the energizing circuit for the first mentioned heater, an electrical conductor leading from a conductor of the last mentioned circuit to said lower contact of the thermostat and effective to divert the energizing current from said booster heater when the thermostat is closed at said lower contact, whereby the thermostat cycles until the combined temperature effects of the first mentioned heater and the coolant is sufficient to maintain the thermostat closed at its said lower contact, and a resistor interposed in the connector leading to said lower contact whereby the functioning of the thermostat does not render ineffective the energizing circuit to the first mentioned heater.

WILLIAM M. SMITH.

REFERENCES CITED

The following references are of record in the file of this patent:

UNITED STATES PATENTS

| Number | Name | Date |
|---|---|---|
| 1,390,497 | Chance et al. | Sept. 13, 1921 |
| 1,653,685 | Whittington | Dec. 27, 1927 |
| 2,165,569 | Obermaier | Apr. 26, 1949 |
| 2,468,676 | Liben | Apr. 26, 1949 |
| 2,460,134 | Lee | Jan. 25, 1949 |